(12) United States Patent
Garner, IV et al.

(10) Patent No.: US 10,547,498 B1
(45) Date of Patent: Jan. 28, 2020

(54) HIERARCHICAL, MULTIFACTOR ALERT ROUTING SYSTEM AND METHOD

(71) Applicant: Wells Fargo Bank, N.A., San Francisco, CA (US)

(72) Inventors: Andrew J. Garner, IV, State Road, NC (US); Nick A. Maiorana, Charlotte, NC (US); Rajib Roy, Charlotte, NC (US); Daniel David, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 40 days.

(21) Appl. No.: 15/349,333

(22) Filed: Nov. 11, 2016

Related U.S. Application Data

(60) Provisional application No. 62/257,387, filed on Nov. 19, 2015.

(51) Int. Cl.
*H04L 12/24* (2006.01)
*H04L 29/08* (2006.01)

(52) U.S. Cl.
CPC ........ *H04L 41/065* (2013.01); *H04L 41/0686* (2013.01); *H04L 41/0806* (2013.01); *H04L 67/303* (2013.01)

(58) Field of Classification Search
CPC ..... H04L 41/06; H04L 67/2833; H04L 43/06; H04L 41/065; H04L 67/303; H04L 41/0806; H04L 41/0686; H04W 68/00; G06F 17/3053
See application file for complete search history.

(56) References Cited

U.S. PATENT DOCUMENTS

| | | | |
|---|---|---|---|
| 7,706,785 B2 | 4/2010 | Lei et al. | |
| 8,219,491 B2 | 7/2012 | Peace et al. | |
| 8,384,549 B2 | 2/2013 | Lemmon | |
| 8,487,758 B2 | 7/2013 | Istoc | |
| 8,823,507 B1 | 9/2014 | Touloumtzis | |
| 2002/0119788 A1 | 8/2002 | Parupudi et al. | |
| 2005/0157865 A1* | 7/2005 | Yeager .................. | G07C 11/00 379/266.06 |
| 2010/0042445 A1 | 2/2010 | Nicosia | |
| 2011/0153744 A1 | 6/2011 | Brown | |

(Continued)

FOREIGN PATENT DOCUMENTS

WO   WO2014/131038 A1   8/2014

OTHER PUBLICATIONS

Ho et al., "Using Context-Aware Computing to Reduce the Perceived Burden of Interruptions from Mobile Devices," CHI 2005, Apr. 2-7, 2005, Portland, OR, 10 pages.

*Primary Examiner* — Austin J Moreau
(74) *Attorney, Agent, or Firm* — Foley & Lardner LLP

(57) ABSTRACT

Alert routing system and methods are described. Alerts are received and aggregated from disparate internet-of-things devices. Alerts may be prioritized based on any combination of: source device-related factors, such as device purpose; subscriber-related factors, such as age, preferences, and restrictions; and subscriber device-related factors, such as ability to receive information in particular formats. In some instances, alerts are further prioritized based on the location of the system's components. Additionally, in some instances, alerts are queued for batch processing based, for example, on subscriber schedule and preferences.

24 Claims, 6 Drawing Sheets

(56) References Cited

U.S. PATENT DOCUMENTS

| | | |
|---|---|---|
| 2013/0237287 A1 | 9/2013 | Ferren et al. |
| 2014/0046830 A1 | 2/2014 | Orozco et al. |
| 2014/0068710 A1 | 3/2014 | Lau et al. |
| 2014/0218202 A1* | 8/2014 | Wilson .................. A61B 5/747 340/686.6 |
| 2014/0304155 A9 | 10/2014 | Wilkes |
| 2015/0271630 A1* | 9/2015 | Ferrara .................. H04W 4/02 455/456.3 |
| 2016/0217680 A1* | 7/2016 | Gu ....................... G08B 25/001 |

\* cited by examiner

HIERARCHICAL, MULTIFACTOR ALERT ROUTING SYSTEM AND METHOD

CROSS-REFERENCE TO RELATED APPLICATIONS

This application claims priority to U.S. Provisional Patent Application No. 62/257,387, entitled "HIERARCHICAL, MULTIFACTOR ALERT ROUTING SYSTEM AND METHOD," by Garner IV et al., filed on Nov. 19, 2015, which is herein incorporated by reference in its entirety and for all purposes.

TECHNICAL FIELD

The present application relates generally to an alert routing system that delivers alert messages from internet-of-things (IoT) devices.

BACKGROUND

Increasingly, devices and systems within people's homes, business environments, and public infrastructures are configured to self-monitor, gather data, and alert end users to potential malfunctions, supply outages, emergency conditions, and other situations in which end users may need to act. Such devices and systems are known generally as internet-of-things (IoT) devices. The IoT devices are electronic devices that gather data and communicate data over the Internet. For example, an IoT device may be a smart watch, an Internet-connected appliance, a smart thermostat, or the like. The data gathered by these IoT devices can be communicated over device-to-device communication channels (e.g., with other IoT devices), directly from IoT devices to end user devices, or from the IoT devices to backend systems associated with the IoT devices.

As the popularity of IoT devices grows, more and more subscribers are utilizing IoT devices and systems to manage different aspects of their lives. This growth in popularity has led to IoT devices and systems that may be programmed to communicate via different and incompatible communication protocols. For example, communication protocols may be proprietary and/or highly customized to accommodate a purpose of a particular IoT device and the alert data that the IoT device is expected to generate. In other instances, IoT devices come from a plurality of different brands and may not be designed to communicate data with a common entity or cooperate with each other. For example, a user that has several different IoT devices is conventionally expected to have a separate account with each provider or manufacturer of the user's plurality of IoT devices. Further, each manufacturer conventionally provides its own user interface, such as a website or a smartphone application. The different communication protocols used by different IoT devices also limit the ability to route smart alerts to users that utilize data from a plurality of different IoT devices to form an alert.

SUMMARY

One example embodiment relates to a method of distributing alerts based on received internet of things device information. The method includes receiving, by an alert routing system, information from an internet of things device relating to a condition monitored by the internet of things device. The internet of things device is associated with a subscriber of the alert routing system. The method further includes determining, by the alert routing system, that the information corresponds to an alert condition. The method includes determining, by the alert routing system, a final alert recipient hierarchy including at least a first alert recipient. The final alert recipient hierarchy represents an alert distribution order, wherein the first alert recipient is a first-in-line recipient in the final alert recipient hierarchy. The method includes generating, by the alert routing system, a first alert message including an identification of a type of alert, a time of the alert, and a location of the alert. The method further includes sending, by the alert routing system, the first alert message to a first user device associated with the first alert recipient.

Another example embodiment relates to a method of distributing alerts based on received internet of things device information. The method includes receiving, by an alert routing system, first information from a first internet of things device relating to a first condition monitored by the first internet of things device. The first internet of things device is associated with a subscriber of the alert routing system. The method further includes determining, by the alert routing system, that the first information corresponds to a first alert condition. The method includes generating, by the alert routing system, a listing of alert conditions, wherein the listing of alert conditions includes the first alert condition. The method further includes receiving, by the alert routing system, second information from a second internet of things device relating to a second condition monitored by the second internet of things device. The second internet of things device is associated with the subscriber. The method includes determining, by the alert routing system, that the second information corresponds to a second alert condition. The method further includes adding, by the alert routing system, the second alert condition to the listing of alert conditions.

A further example embodiment relates to an alert routing system. The system includes a subscriber database storing a plurality of subscriber profiles and a device database storing a plurality of internet of things device associations with the plurality of subscriber profiles. The system further includes a network interface configured to receive information from the plurality of internet of things devices related to conditions monitored by the internet of things devices. The system includes at least one processor and memory. The memory has instructions stored therein that are executed by the at least one processor and cause the at least one processor to receive information from an internet of things device relating to a condition monitored by the internet of things device. The internet of things device is associated with a subscriber of the alert routing system. The instructions further cause the at least one processor to determine that the information corresponds to an alert condition and to determine a final alert recipient hierarchy including at least a first alert recipient. The final alert recipient hierarchy represents an alert distribution order, wherein the first alert recipient is a first-in-line recipient in the final alert recipient hierarchy. The instructions further cause the at least one processor to generate a first alert message including an identification of a type of alert, a time of the alert, and a location of the alert; and to send the first alert message to a first user device associated with the first alert recipient.

Another example embodiment relates to an alert routing system. The system includes a subscriber database storing a plurality of subscriber profiles and a device database storing a plurality of internet of things device associations with the plurality of subscriber profiles. The system further includes a network interface configured to receive information from the plurality of internet of things devices related to conditions monitored by the internet of things devices. The system includes at least one processor and memory. The memory has instructions stored therein that are executed by the at least one processor and cause the at least one processor to receive first information from a first internet of things device relating to a first condition monitored by the first internet of things device. The first internet of things device is associated with a subscriber of the alert routing system. The instructions further cause the at least one processor to determine that the first information corresponds to a first alert condition and to generate a listing of alert conditions, wherein the listing includes of alert conditions includes the first alert condition. The instructions further cause the at least one processor to receive second information from a second internet of things device relating to a second condition monitored by the second internet of things device. The second internet of things device is associated with the subscriber. The instructions further cause the at least one processor to determine that the second information corresponds to a second alert condition and to add the second alert condition to the listing of alert conditions.

These and other features, together with the organization and manner of operation thereof, will become apparent from the following detailed description when taken in conjunction with the accompanying drawings.

DETAILED DESCRIPTION

Referring to the figures generally, hierarchical, multifactor alert routing systems and methods are described. Alerts are received and aggregated from multiple IoT devices. Alerts are prioritized based on any combination of source device-related factors, such as device type, device purpose, device location, and the like; subscriber-related factors, such as age, preferences, and restrictions; and subscriber device-related factors, such as ability to receive information in particular formats. In some instances, alerts are further prioritized based on the location of the system's components. Additionally, in some instances, alerts are queued for batch processing and batch delivery to users based at least in part on subscriber schedule and preferences.

Figure 1:
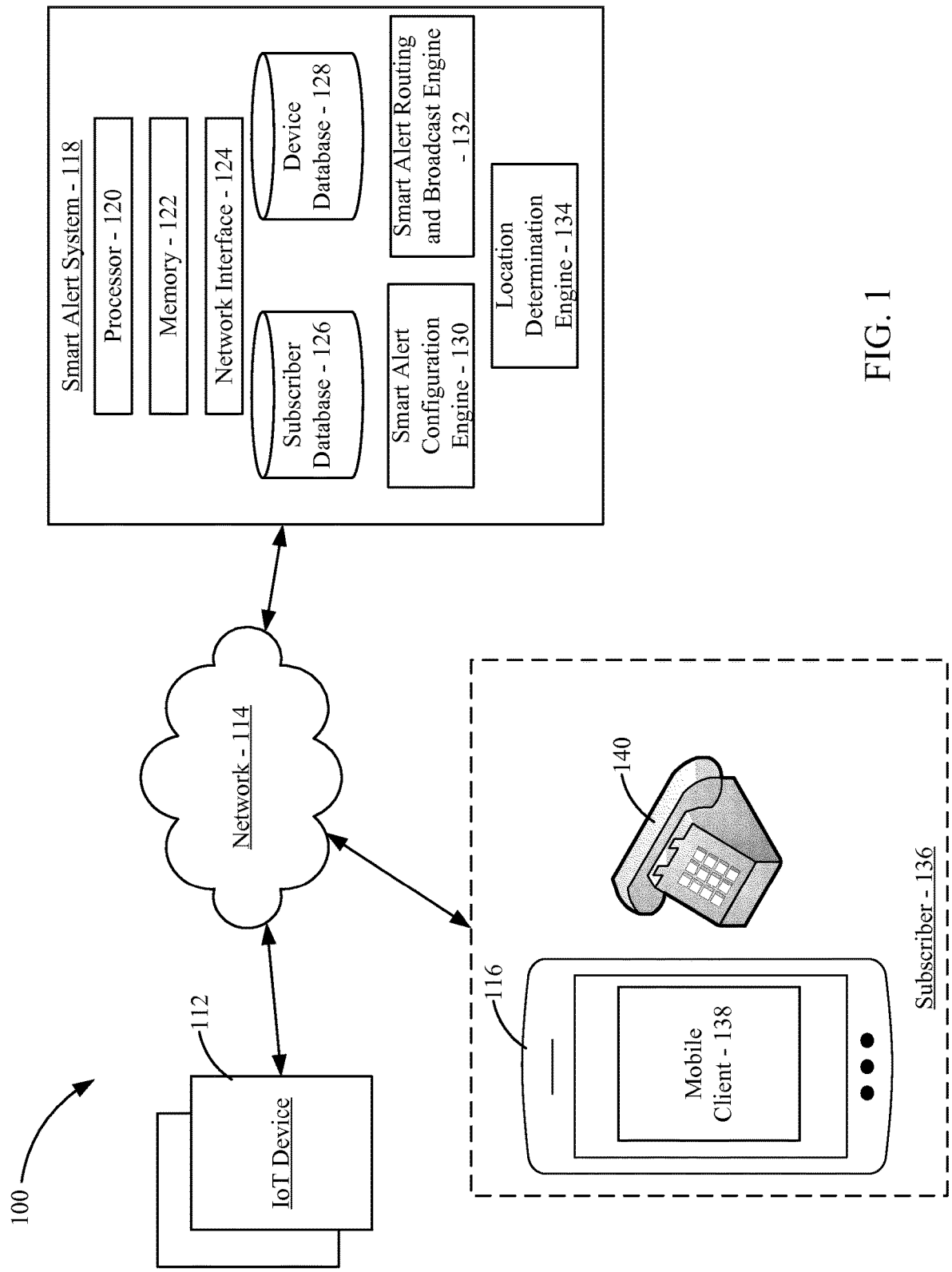
FIG. 1 is a diagram of a computing system associated with a hierarchical, multifactor alert routing system and methods according to an example embodiment.

Referring to FIG. 1, a diagram of a hierarchical, multifactor alert routing system 100 according to an example embodiment is shown. As described in further detail below, the hierarchical, multifactor alert routing system 100 includes at least one IoT device 112, a user device 116 (e.g., associated with a subscriber 136), and a smart alert system 118. In an example arrangement, components are connected via a network 114 (e.g., the Internet). In reference to components described herein, references to the components in singular or in plural form are not intended as disclaimers of alternative arrangements unless otherwise indicated. The components are configured to interact, in some arrangements, as described below with reference to the figures.

The IoT device 112 can include various components, such as sensors (e.g., environment sensors, cameras, microphones, thermometers, etc.), data transmission components that allow the IoT device 112 to communicate data to and from other devices (e.g., the smart alert system 118, other IoT devices, user devices, etc.) via the network 114, and user interface components (e.g., user inputs, displays, etc.). The system 100 can include a single IoT device 112 or multiple IoT devices 112.

The system 100 includes the smart alert system 118. The smart alert system 118 includes a processor 120, memory 122, a network interface 124, a subscriber database 126, a device database 128, a smart alert configuration engine 130, a smart alert routing and broadcast engine 132, and a location determination engine 134. The memory 122 stores programming modules that, when executed by the processor 120, control the operation of the smart alert system 118. The network interface 124 facilitates data communication to and from the smart alert system 118 via the network 114. The above-described components of the smart alert system 118 reside in whole or in part on a server or are distributed across multiple servers. For example, in one arrangement, the processor 120, memory 122, the network interface 124, the subscriber database 126, the device database 128, the smart alert configuration engine 130, the smart alert routing and broadcast engine 132, and the location determination engine 134 reside on a single server. In another arrangement, the processor 120, memory 122, the network interface 124, the subscriber database 126, the device database 128, the smart alert configuration engine 130, the smart alert routing and broadcast engine 132, or the location determination engine 134 reside on different servers. In yet further arrangement, the processor 120, memory 122, the network interface 124, the subscriber database 126, the device database 128, the smart alert configuration engine 130, the smart alert routing and broadcast engine 132, or the location determination engine 134 reside in part on different servers in relation to other components or to the whole of a particular component.

The subscriber 136 is associated with the user device 116. The user device 116 is capable, in whole or in part, of receiving or transmitting data. The user device 116 may be a smartphone, a PDA, a laptop, a desktop computer, a tablet computer, a wearable device (e.g., a smartwatch, a fitness tracker, smart glasses, etc.), or the like. The user device 116 includes a mobile client 138 that allows the subscriber 136 to configure a subscriber account with the smart alert system 118, register IoT devices 112 with the smart alert system 118, and receive smart alerts initiated by the smart alert system 118. In some arrangements, the mobile client 138 is a program executed on the user device 116. In other arrangements, the mobile client 138 is a website accessed via a web browser on the mobile client 138. In some arrangements, the subscriber 136 can also receive alerts from the smart alert system 118 via other devices, such as a telephone 140.

As described in further detail below, the smart alert system 118 receives information from the IoT devices 112, creates alerts based on the received information, and selectively routes the alerts to the subscriber 136. In some arrangements, the alerts can be based on information received from a plurality of different IoT devices 112 that are not originally designed to communicate with each other (e.g., each of the IoT devices 112 has a different communication protocol, each of the IoT devices 112 has a different user account and/or access application, each of the IoT devices 112 may have a different authentication requirement and/or process, etc.). In these arrangements, the smart alert system 118 also functions as a hub that gathers data from the different IoT devices 112 for combined or aggregate interpretation, analysis, triage, and the like by the smart alert system 118.

Figure 2:
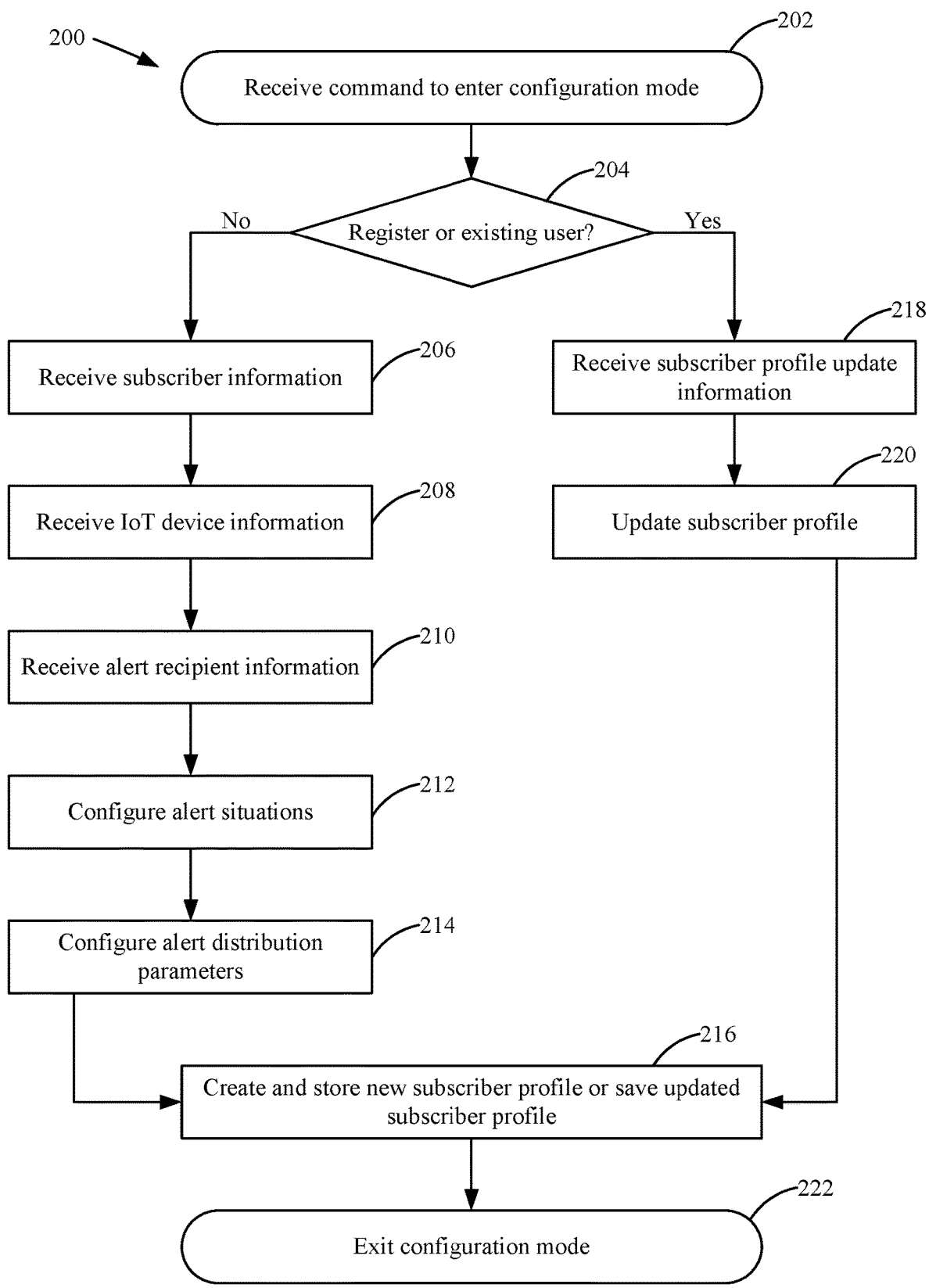
FIG. 2 is a flow diagram of a method of configuring a hierarchical, multifactor alert routing system according to an example embodiment.

Referring to FIG. 2, a flow diagram of a method 200 of configuring a hierarchical, multifactor alert routing system, such as the smart alert system 118, is shown according to an example embodiment. The method 200 is performed by the smart alert system 118 via the processor 120 and the smart alert configuration engine 130. While performing the method 200, the smart alert system 118 communicates data to and from various devices (e.g., IoT devices 112, the user device 116, etc.) via the network 114. As described in further detail below, the configuration includes creating a profile for the subscriber 136, pairing (i.e., configuring the smart alert system 112 to communicate with a given IoT device 112, including configuring communication protocols and authentication requirements) the smart alert system 118 with the various IoT devices 112 associated with the subscriber 136, and configuring the subscriber profile with alert preferences.

A command to enter configuration mode is received at 202. The smart alert system 118 receives the command from the user device 116 via the network 114. The command is initiated by the subscriber 136. The command received at 202 instructs the smart alert system 118 to enter a configuration mode. For example, the command may be received in response to a request from the subscriber 136 to register as a user of the smart alert system 118 or to update an existing subscriber profile associated with the subscriber 136. While in the configuration mode, the smart alert system 118 can be programmed to communicate with IoT devices 112, to interpret data received from IoT devices 112, to create or update subscriber profiles based on subscriber information (e.g., contact information, subscriber characteristics, associated IoT devices 112, etc.), and to create or update alert hierarchy information. In response to the command at 202, the smart alert system 118 enters the configuration mode.

Based on the command received at 202, the smart alert system 118 determines whether the command is in response to a request to register with the smart alert system 118 or is in response to a request to update an existing subscriber profile with the smart alert system 118 at 204. If at 204 the smart alert system 118 determines that the command is in response to a request to register with the smart alert system 118 at 204, subscriber information is received at 206. The smart alert system 118 receives the subscriber information from the user device 116 via the network 114. The subscriber information relates to the subscriber 136. The subscriber information may include, for example, contact information relating to the subscriber 136 (e.g., address, phone number, e-mail address, etc.) and subscriber characteristics (e.g., age, physical capabilities, knowledge of device repair, etc.). In some arrangements, the subscriber information includes a user defined username and password that can be used by the smart alert system 118 to later authenticate the subscriber 136.

IoT device information is received at 208. The smart alert system 118 receives the IoT device information from the user device 116 via the network 114. The IoT device information relates to at least one IoT device 112. The IoT device information includes, for example, device type, performance measures or alert factors, measurement ranges for performance measures or alert factors (e.g., comprising a lower bound value and an upper bound value for, for example, heart rate or temperature, monitoring time period information, data measuring tolerances, etc.), device component information, and alert configuration information. The IoT device information allows the smart alert system 118 to communicate with the IoT device 112 either directly (via the network 114) or indirectly (e.g., by accessing a customer profile at a manufacturer web site associated with the subscriber 136). In some arrangements, the smart alert system 118 tests the received IoT device information to ensure that the received IoT device information allows the smart alert system 118 to receive data from a given IoT device 112. For example, the smart alert system 118 can attempt to log into to web service affiliated with the IoT device 112 to verify that the smart alert system 118 can access the IoT device 112 data. Alternatively, the smart alert system 118 can attempt to exchange data with and/or pair the IoT device 112 with the smart alert system 118. If the IoT device information is incorrect, the smart alert system 118 can prompt the subscriber 136 to correct the provided IoT device information.

Alert recipient information is received at 210. The smart alert system 118 receives the alert recipient information from the user device 116 via the network. The alert recipient information includes contact information for potential alert recipients associated with the subscriber 136. For example, the alert recipient information may include phone numbers and e-mail addresses associated individuals that can receive alerts from the smart alert system 118. In some arrangements, the alert recipient information also includes characteristic and ability information for each alert recipient. The characteristic and ability information can include any of age, sex, repair skills (e.g., knows how to turn off water, knows how to reset electric breakers, etc.), and the like. In further arrangements, the alert recipient information includes providing the smart alert system 118 access to a location-providing device (e.g., a smartphone) associated with an alert recipient. The location-providing device provides location information associated with a given alert recipient to the alert system 118. As described in further detail below, the smart alert system 118 can use the location information of identified alert recipients to route alerts to alert recipient that is closest to the location of the alert.

Alert situations are configured at 212. The subscriber 136 configures alert situations with the smart alert system 118. The smart alert system 118 receives the alert situations from the user device 116. The alert situations relate to IoT device readings and combinations of IoT device readings that identify potential circumstances that may require the attention of a user (e.g., the subscriber 136 or another alert recipient). For example, the alert situation may relate to a gas leak, water leaks, power outages, potential intruders, HVAC malfunctions, and the like. In some arrangements, the smart alert system 118 suggests alert situations based on the received IoT device information. For example, the smart alert system 118 can suggest an alert condition indicating a potential pipe leak or left running faucet if a motion detector determines nobody is at the subscriber's home and the water heater is transmitting information indicating that the hot water is running.

Alert distribution parameters are configured at 214. The smart alert system 118 receives the alert distribution parameters from the user device 116. The alert distribution parameters relate to the order and timing in which the smart alert system 118 distributes alerts to the alert recipients when an alert situation is detected. The alert distribution parameters may be different for each alert situation. The alert distribution parameters can be an identification of a single individual to be alerted, a listing of a group of individuals to be alerted, a hierarchy of individuals or groups to be alerted at different times. In some arrangements, the alert distribution parameters include location-based overrides that instruct the smart alert system 118 to skip delivering an alert if the alert recipient is not in the vicinity of the alert situation. For example, in a hierarchy of individuals to be alerted in the case of a detected possible water leak, the smart alert system 118 can skip alerting an individual if the individual is not within a threshold proximity (e.g., within 15 miles) of the alert situation. In other arrangements, the alert distribution parameters can relate to the smart alert system 118 automatically selecting the best available alert recipient. The best available alert recipient can be based on a combination of the location of each potential alert recipient and the characteristics of each potential alert recipient (e.g., ability to address the alert situation). To determine the best available alert recipient, each potential alert recipient can be scored (e.g., on a scale of 0-100). The smart alert system 118 can distribute the alerts in a hierarchical manner based on a ranking of the best available alert recipients.

The new subscriber profile is created and stored at 216. The smart alert system 118 saves the subscriber profile and the associated preferences in the subscriber database 126 and/or in the device database 128. After the subscriber profile is fully configured and saved after completing 206 through 216, the smart alert system 118 exists the configuration mode at 222, and method 200 ends.

If the smart alert system 118 determines that the command is in response to a request to update an existing subscriber profile at 204, updated subscriber profile information is received at 218. The smart alert system 118 receives the updated subscriber profile information from the user device 116 via the network 114. The updated subscriber profile information can include any of updated subscriber information (e.g., updated contact information, updated abilities, etc.), updated IoT device information (e.g., to remove previously paired IoT devices 112 from the subscriber profile, to pair new IoT devices 112 with the subscriber profile, etc.), updated alert recipient information (e.g., to remove alert recipients, to add new alert recipients, to adjust alert recipient contact information, to adjust alert recipient ability information, etc.), updated alert situation information (e.g., to create new alert conditions based on the IoT devices 112, to remove existing alert conditions based on the IoT devices 112, to adjust the settings of existing alert conditions based on the IoT devices 112, etc.), and/or updated alert distribution parameters (e.g., changing the hierarchy that defines when alert recipients receive alerts, changing alert distribution channels, etc.).

The subscriber profile is updated at 220. The smart alert system 118 updates the subscriber profile based on the updated information received at 218. To effect the update, the smart alert system 118 may update files stored in the subscriber database 126 and/or in the device database 128 depending on the information received at 220. The updates are saved at 216. The smart alert system 118 saves the updates in the subscriber database 126 and/or in the device database 128. After the subscriber profile is updated or stored at 216, the smart alert system 118 exists the configuration mode at 224, and method 200 ends.

Figure 3:
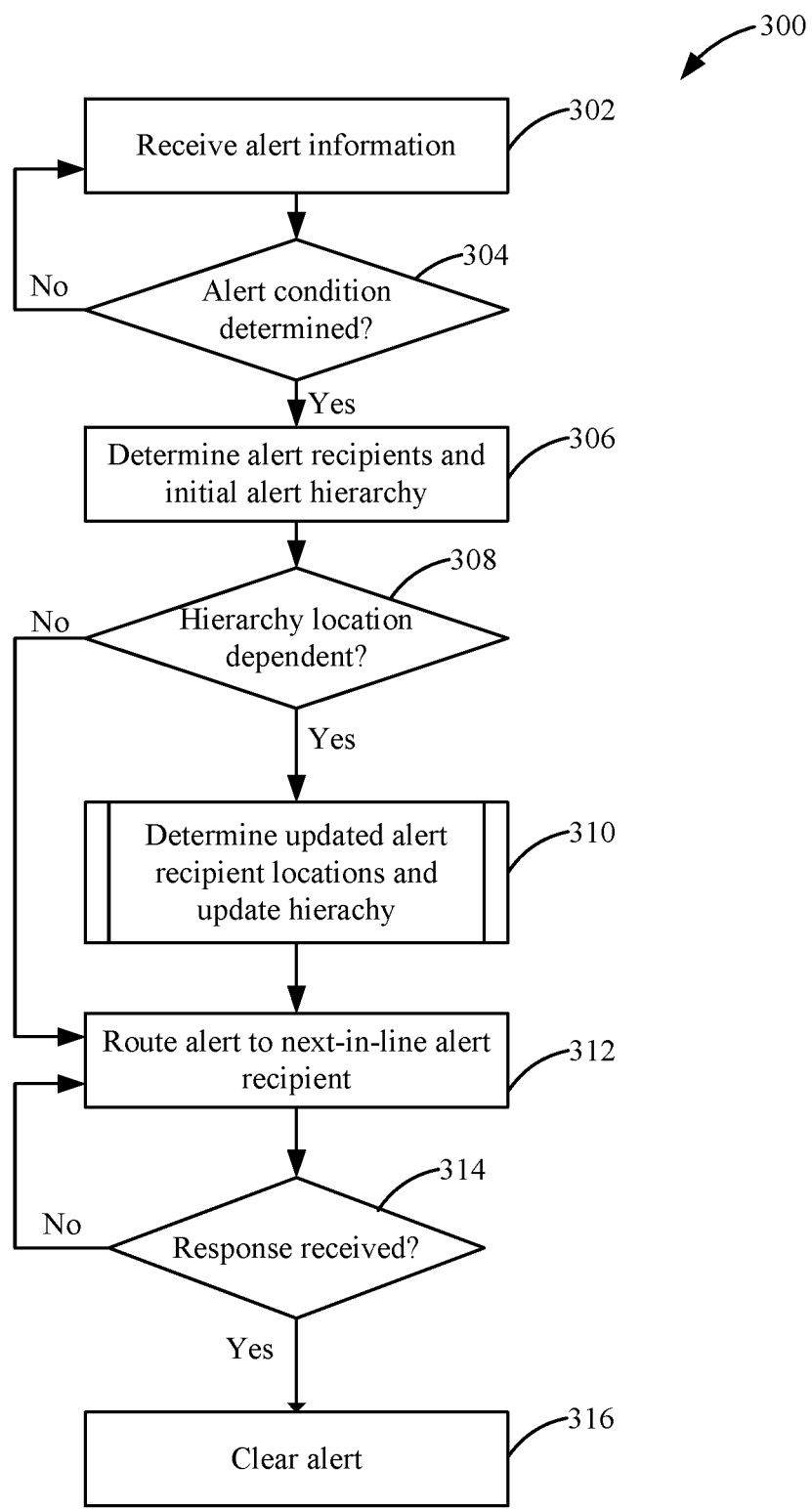
FIG. 3 is a flow diagram of a method of distributing alerts based on IoT device information via a hierarchical, multifactor alert routing system according to an example embodiment.

Referring to FIG. 3, a flow diagram of a method 300 of distributing alerts based on IoT device information via a hierarchical, multifactor alert routing system is shown according to an example embodiment. Method 300 is performed by the smart alert routing and broadcast engine 132 of smart alert system 118. The method 300 is performed for each subscriber 136. The smart alert system 118 initiates method 300 based on information received from at least one IoT device 112 associated with the subscriber 136. As described in further detail, during method 300, the smart alert system 118 communicates data to and from various devices (e.g., IoT devices 112, subscriber devices 116 or 140, etc.) via network 114.

Alert information is received at 302. The smart alert system 118 receives alert information from at least one IoT device 112 via the network 114 (e.g., at the routing and broadcast engine 132). In some arrangements, the information is received from a single IoT device 112. In other arrangements, the information is received from a plurality of IoT devices 112. The information may be received directly from a given IoT device 112 via the network 114 or from a third-party service associated with a given IoT device 112 such as (a server associated with IoT devices of a given manufacturer. Alert information received at 302 includes any of an IoT device identifier for each IoT device 112 associated with the information, data gathered by the IoT device 112 (IoT device information), and a location of the alert. The IoT device information generally relates to a condition or characteristic of a device or environment as monitored by the IoT device 112. For example, the IoT device information may relate to temperature information from heating and cooling devices, heart rate information from health sensors associated with humans or pets, flow information associated with water or natural gas devices, usage information associated with appliances or other devices, and the like. The IoT device information may relate to a specific number, a range of numbers, a number count, a status, time information, or a descriptor. In some arrangements, the IoT device information includes a priority indicator (e.g., urgent, emergency, normal, etc.).

The smart alert system 118 determines whether the received alert information corresponds to an alert condition at 304. The alert conditions were previously configured at 212 or 218 of method 200. For example, the alert conditions can relate to health emergencies, appliance failures, mechanical failures, and the like. If the received alert information does not correspond to an alert condition, the method 300 returns to 302. If the received alert information corresponds to an alert condition, the method 300 continues.

Alert recipients and an initial alert hierarchy are determined at 306. The smart alert system 118 determines the alert recipients and the initial alert hierarchy based on the preferences of the subscriber 136 (e.g., as programmed during method 200). Depending on the type of alert determined at 304, and in some cases a priority or urgency of the alert, the alert can be routed to a single recipient (e.g., just the subscriber 136), a plurality of alert recipients (e.g., the subscriber 136, the subscriber's family, the subscriber's neighbors, etc.). In situations in which a plurality of alert recipients are to be notified, the plurality of alert recipients can be notified at the same time or in a hierarchical order until a recipient responds to the alert. Accordingly, the smart alert system 118 determines the initial hierarchical order based on the subscriber 136 preferences as set in method 200. If only a single alert recipient is identified, the method 300 skips to 312.

After the alert recipients and the initial alert hierarchy are determined at 306, the smart alert system 118 determines whether the initial alert hierarchy is location dependent at 308. In some arrangements, the hierarchy of alert recipients is arranged at least in part based on a proximity of a given alert recipient to the location of the alert. For example, if the determined alert condition relates to a water leak, the smart alert system 118 can be configured to route the alert to a neighbor of the subscriber 136 that is next-door to the location of the water leak when the subscriber 136 is out of town and unable to take action with respect to the water leak. If the hierarchy is not location dependent, the method 300 proceeds to 312.

Figure 4:
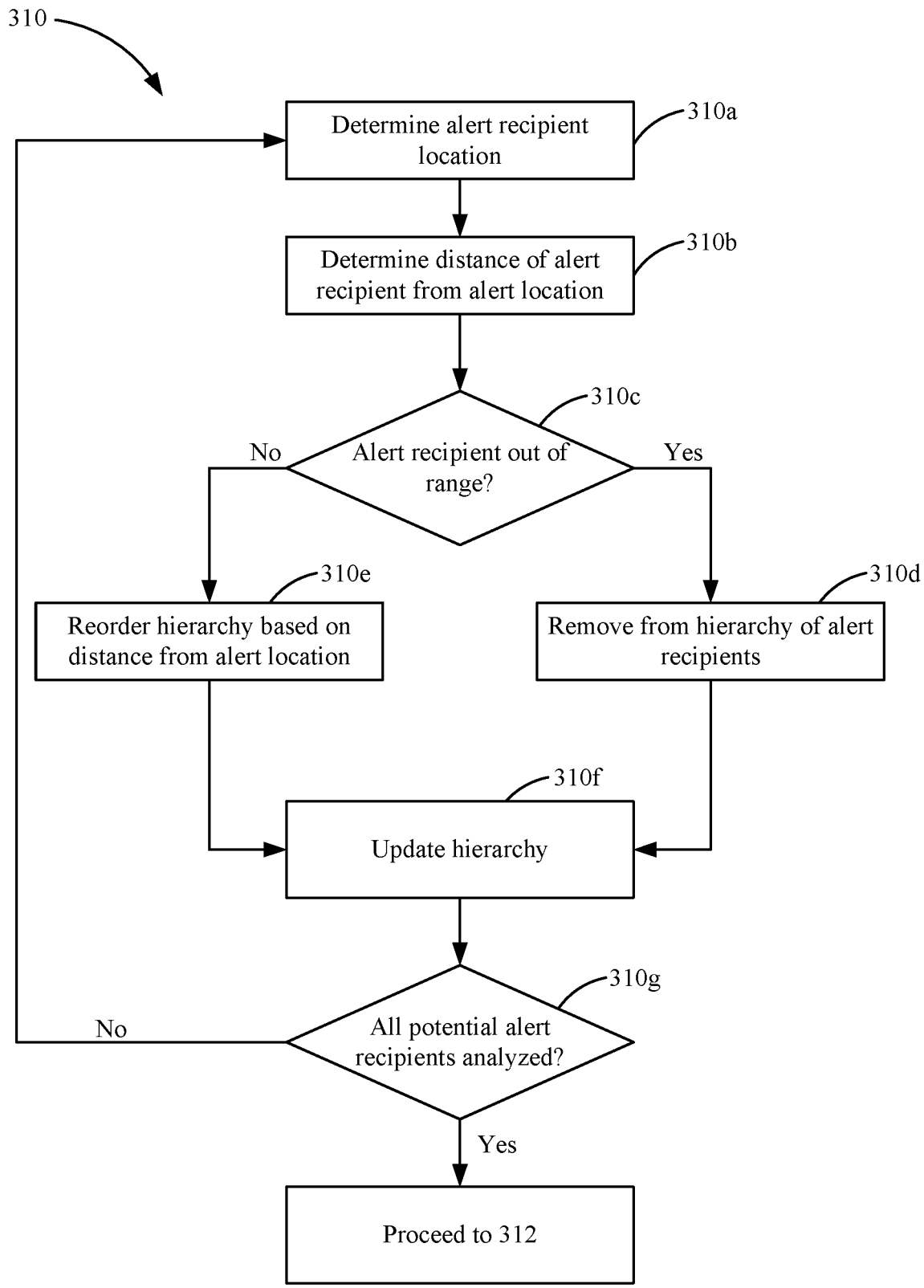
FIG. 4 is a flow diagram of a method of capturing component location data via a hierarchical, multifactor alert routing system according to an example embodiment.

If the hierarchy is location dependent, updated alert recipient locations are determined at 310. Referring to FIG. 4, the process 310 of determining updated alert recipient locations is described in further detail. Process 310 is a sub-process of the method 300. Process 310 is repeated for every alert recipient of the initial alert recipient hierarchy determined at 306. Process 310 begins when an alert recipient location is determined at 310a. The smart alert system 118 determines the location of the alert recipient based on location information received from a mobile device (e.g., user device 116). In some arrangements, the smart alert system 118 pulls the location information from the mobile device associated with the alert recipient. In other arrangements, the smart alert system 118 periodically receives location information from the mobile device associated with the alert recipient in a data push arrangement. The location information may relate to GPS coordinates, WiFi SSID information, cellular tower location information, or the like.

The distance of the alert recipient from the alert location is determined at 310b. The smart alert system 118 compares the location of the alert recipient (as determined at 310a) with the location of the alert (as received at 302), and in some cases a priority or urgency of the alert, to determine the distance of the alert recipient from the alert location. The distance may be determined in feet, yards, miles, or the like. Based on the determined distance, the smart alert system 118 determines whether the alert recipient is out of range of the alert location at 310c. In some situations, the user is beyond a threshold distance from the alert location to act on the alert in a timely manner. For example, if the alert condition relates to a water leak at a residence in Chicago, Ill., and the potential alert recipient is in San Francisco, Calif., the smart alert system 118 can eliminate the potential alert recipient from the hierarchy of alerts because the alert recipient is beyond a threshold distance from the alert location. The threshold distance can be automatically configured by the smart alert system 118 (e.g., based on the type of alert) or set by the subscriber 136 (e.g., at 214 of the method 200). In some instances, the subscriber 136 can override the threshold distance for certain alert recipients. For example, the subscriber 136 can configured his account such that the subscriber 136 always receives notifications no matter how far away the subscriber 136 is from the alert condition.

If the alert recipient is beyond the threshold distance, the alert recipient is removed from the hierarchy at 310d. The smart alert system 118 removes the alert recipient from the hierarchy for this instance of the alert. Accordingly, the alert recipient will not receive an alert for the alert condition. However, the alert recipient is still eligible to receive alerts relating to other alert conditions (e.g., other types of alerts, future alerts, etc.). If the alert recipient is not beyond the threshold distance, the alert recipient's position within the hierarchy is reordered at 310e. The smart alert system 118 reorders the hierarchy based at least in part on each recipient's distance from the alert location. In some arrangements, other factors are also used to prioritize certain alert recipients (e.g., ability to fix the problem causing the alert, age, etc.). After the hierarchy is reordered at 310e or after a recipient is removed from the hierarchy at 310d, the hierarchy is updated at 310f. The smart alert system 118 updates the alert hierarchy based on the recipient location.

At 310g, the smart alert system 118 determines if all potential alert recipients have been analyzed according to process 310. If additional potential alert recipients remain, process 310 returns to 310a. If all potential alert recipients have been analyzed, process 310 ends and the method returns to 312.

Referring again to FIG. 3, the method 300 continues by routing an alert to the next-in-line alert recipient at 312. The smart alert system 118 sends the alert to the next-in-line alert recipient on the hierarchy. The alert is an automatically generated message created by the smart alert system 118 that includes an identification of the type of alert, the time the alert was initiated, the location of the alert, and in some cases a priority or urgency of the alert. In some arrangements, the message includes additional details, such as instructions on how to correct a problem causing the alert, contact information for a technician that can correct the problem, and the like. The message may be a text message sent to a phone number associated with the next-in-line alert recipient, an e-mail sent to an e-mail address associated with the next-in-line alert recipient, a push notification sent to a user device running the mobile client 138, an automated voice message sent to a phone number associated with the next-in-line alert recipient, a social media message sent to a social media account associated with the next-in-line alert recipient, or the like.

At 314, the smart alert system 118 determines whether a response to the alert sent at 312 was received within a threshold period of time. The threshold period of time may be set automatically by the smart alert system 118 or by the subscriber 136. The threshold period of time relates to a response period of time (e.g., in minutes, in hours, etc.) that an alert recipient is given to respond to a transmitted alert. In some arrangements, the response relates to a confirmation of receipt. In other arrangements, the response indicates that the problem has been taken care of. In further arrangements, the response is received from the IoT device 112 that initiated the alert condition by sending updated IoT information indicating that the alert condition has been corrected. If no response was received within the threshold period of time, the method 300 returns to 312 and routes a new message to the next-in-line alert recipient on the hierarchy. In situations in which the hierarchy has no additional next-in-line alert recipients, the smart alert system 118 can return to the top of the hierarchy and restart the alert process with the highest priority alert recipient. Alternatively, the smart alert system 118 can transmit a message to an appropriate government authority (e.g., the fire department, the police department, an ambulance, etc.).

If a response was received within the threshold period of time, the alert is cleared at 316. The smart alert system 118 clears the alert. In doing so, the smart alert system 118 may broadcast an all clear message to all alert recipients that received alerts at 312. In some arrangements, prior to clearing the alert at 316, the smart alert system 118 gathers updated IoT device information to verify that the alert condition has been addressed by the subscriber 136 or another alert recipient.

Figure 5:
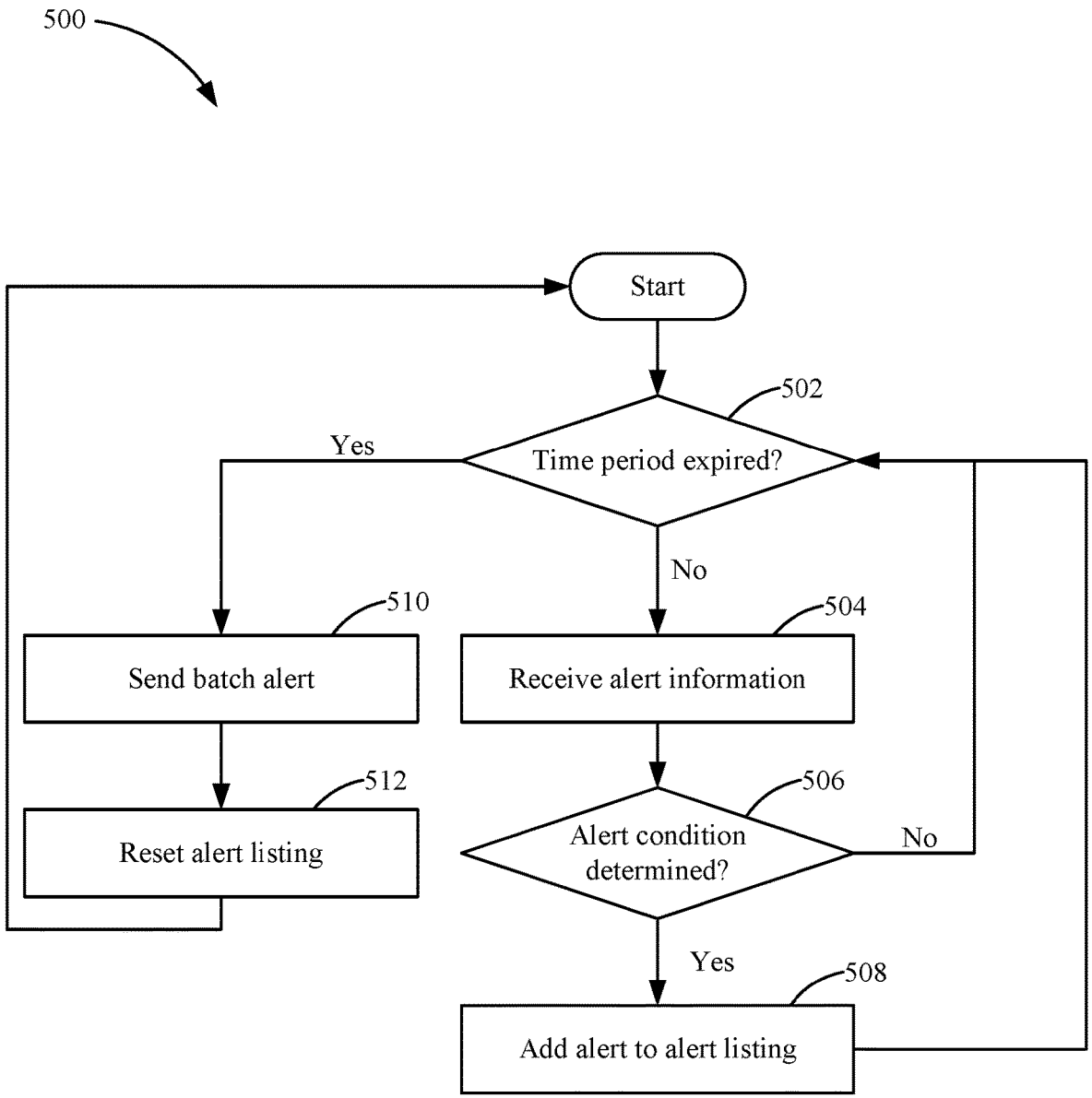
FIG. 5 is a flow diagram of a method of routing and broadcasting alert information via a hierarchical, multifactor alert routing system according to an example embodiment.

Referring to FIG. 5, a flow diagram of a method 500 of sending batch alerts is shown according to an exemplary arrangement. A batch alert is a single alert that contains information relating to multiple alert conditions. For example, a batch alert may be a daily e-mail sent by the smart alert system 118 to a subscriber with a listing of alert conditions that don't require immediate attention. For example, a batch alert may inform the subscriber that a furnace filter needs to be replaced, that the refrigerator is out of milk, that a light bulb is dead, and other non-critical alert conditions. Method 500 is performed by the smart alert routing and broadcast engine 132 of smart alert system 118. The method 500 is performed for each subscriber 136. The smart alert system 118 initiates method 500 based on information received from at least one IoT device 112 associated with the subscriber 136. As described in further detail, during method 500, the smart alert system 118 communicates data to and from various devices (e.g., IoT devices 112, subscriber devices 116 or 140, etc.) via network 114. The method 500 is a repeating, cyclical method that is performed every alert distribution time period (e.g., every day, every hour, etc.).

The method 500 begins by determining whether the alert distribution time period expired at 502. The subscriber 136 can program the smart alert system 118 with batch alert preferences. The batch alert preferences include what types of alerts are batch alerts and how often the batch alerts are delivered (i.e., the alert distribution time period). For example, the subscriber 136 can program the alert distribution time period to be once an hour, once a day, once a week, and so on. The subscriber 136 can also program different alert distribution time periods for different sets of alerts. In some arrangements, the subscriber 136 can provide the smart alert system 118 access to a calendar of the subscriber 136 (e.g., Outlook® or Google® calendar) such that the smart alert system can automatically determine the optimal batch alert delivery time. In such arrangements, the alert distribution time period may not be a consistent time period but may fluctuate based on the subscriber's schedule. For example, the smart alert system 118 can avoid sending alerts while the subscriber 136 is unable to receive the alerts (e.g., while the subscriber 136 is on a plane, while the subscriber 136 is seeing a movie, while the subscriber 136 is in a business meeting, etc.). During the initial cycle of the method 500, the smart alert system 118 will not determine that the time period has expired at 502. As discussed in further detail below, at a later point in the method 500, the smart alert system 118 may determine that the time period has expired at 502.

If the time period has not expired at 502, alert information is received at 504. The smart alert system 118 receives alert information from at least one IoT device 112 via the network 114 (e.g., at the routing and broadcast engine 132). In some arrangements, the information is received from a single IoT device 112. In other arrangements, the information is received from a plurality of IoT devices 112. The information may be received directly from a given IoT device 112 via the network 114 or from a third-party service associated with a given IoT device 112 (e.g., a server associated with IoT devices of a given manufacturer. Alert information received at 302 includes any of an IoT device identifier for each IoT device 112 associated with the information, data gathered by the IoT device 112 (IoT device information), and a location of the alert. For example, the IoT device information may relate to temperature information from heating and cooling devices, heart rate information from health sensors associated with humans or pets, flow information associated with water or natural gas devices, usage information associated with appliances or other devices, and the like. The IoT device information may relate to a specific number, a range of numbers, a status, or a descriptor. In some arrangements, the IoT device information includes a priority indicator (e.g., urgent, emergency, normal, etc.).

The smart alert system 118 determines whether the received alert information corresponds to an alert condition at 506. The alert conditions were previously configured at 212 or 218 of method 200. For example, the alert conditions can relate to health emergencies, appliance failures, mechanical failures, and the like. If the received alert information does not correspond to an alert condition, the method 500 returns to 502. If the received alert information corresponds to an alert condition, an alert is added to an alert listing at 508. The smart alert system 118 adds the alert to an alert listing that has not yet been distributed to the subscriber 136 or another alert recipient. The alert listing contains a listing of alerts that occur within the alert distribution time period. Each alert within the listing includes an indication of the type of the alert condition, a description of the alert condition, and a time of the alert (e.g., a date and a time that the alert condition was determined). In some arrangements, the alert includes recommended corrective action concerning the alert condition (e.g., replacing a furnace filter, ordering groceries, etc.). The recommended corrective action can include an option to have the smart alert system 118 automatically order a part or request a service person (e.g., schedule a furnace repair service). After the alert is added to the listing, the method 500 returns to 502. Steps 504 through 508 are repeated until the time period expires (as determined at 502). Accordingly, a plurality of alert conditions can be added to the alert listing, each alert condition based on different information received from different IoT devices 112.

If at 502 the smart alert system 118 determines that the time period has expired, the batch alert is sent at 510. The smart alert system 118 generates and sends the batch alert to the batch alert recipient, which may be the subscriber 136 and/or another alert recipient. The batch alert may be sent via e-mail, push message, SMS, or a combination thereof. The batch alert includes the listing of alerts that accrued during the alert distribution time period. In arrangements where no alert conditions were determined by the smart alert system 118 during the alert distribution time period, the smart alert system 118 can either skip step 510 or send an indication to the subscriber 136 and/or other alert recipient(s) that no alert conditions were determined during the alert distribution time period.

After the batch alert is sent at 510, the alert listing is reset at 512. The smart alert system 118 resets (i.e., clears) the batch alert listing such that it can be repopulated during the alert distribution time period. After resetting the alert listing, another cycle of method 500 begins.

Figure 6:
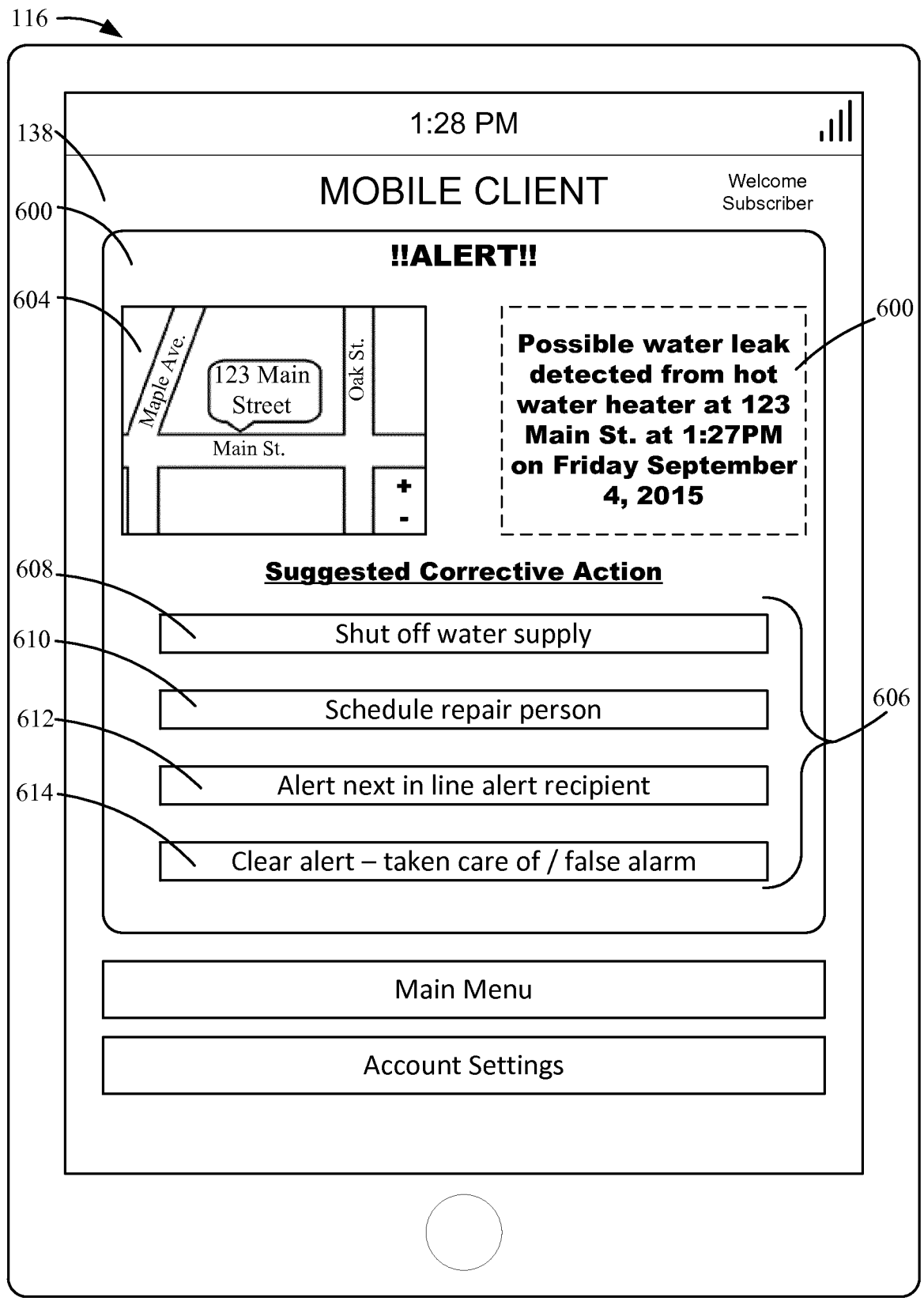
FIG. 6 shows an example alert initiated by the alert routing system of FIG. 1.

Referring to FIG. 6, an example alert 600 is shown according to an example arrangement. The alert 600 is sent by the smart alert system 118 to the subscriber 136 (or another alert recipient) via the mobile client 138 on the user device 116. The alert 600 is sent to the user device 116 based on a determined or detected alert situation (e.g., as determined in the methods 300 or 500). In the particular arrangement, the alert 600 relates to a possible water leak detected by the smart alert system 118. The alert 600 includes a description 602 of the alert. The description 602 includes an indication of the type of alert, the address of the alert location, and a time and date that the alert was detected. The alert 600 includes a user-interactive map insert 604 showing the alert location. The user can interact with the map insert 604 to zoom in, zoom out, and pan the displayed portion of the map.

The alert 600 also includes a listing 606 of suggested corrective actions in response to the alert 600. As shown in FIG. 6, there are four suggested corrective actions (indicated by buttons 608-614). However, any number of suggested corrective actions can be presented to the subscriber 136 (or other alert recipient). Each of the buttons 608-614 is user-interactive such that the user can select a given button to initiate the respective correction action (e.g., by interacting with a touchscreen display of the user device 116). Each of the suggested corrective actions are automatically selected by the smart alert system 118. In some arrangements, the displayed suggested corrective actions are automatically selected from a listing of user-preapproved corrective actions to a given alert type. As shown in FIG. 6, the listing 606 includes the option to shut off the water supply (button 608), the option to schedule a repair person (button 610), the option to alert another recipient (button 612), and the option to clear the alert (button 614). If the user interacts with button 608, the smart alert system 118 can send a signal to an IoT water valve that controls the water supply to the water heater instructing the water valve to shut off the water supply to the water heater. If the user interacts with the button 610, the smart alert system 118 can schedule a repair person to come fix the water heater. In doing so, the smart alert system 118 can view a calendar associated with the subscriber to identify an appropriate time for the repair appointment, identify an appropriate repair service, and schedule the repair service for the identified appropriate time. The smart alert system 118 identifies the appropriate repair service by performing an Internet search on a review website (e.g., Yelp®, Angie's List®, etc.), locating repair services that service the location of the alert, and selecting a user-approved repair service (e.g., a user identified repair service, a repair service having a threshold rating, etc.). In an alternate arrangement, the smart alert system 118 presents the user a listing of available repair services for user selection. If the user interacts with the button 612, the smart alert system 118 alerts the next-in-line alert recipient (e.g., as described in further detail above with respect to the method 300). If the user interacts with the button 614, the smart alert system 118 clears the alert.

The systems and methods described above streamline the interfacing of IoT devices and help users aggregate, time, extract meaningful information from, and act on alerts from different IoT devices. Furthermore, a hierarchical, multifactor alert routing system can be scaled up by creating networks of smart alert hubs for use in, for example, large-scale building automation systems, apartment buildings, and hotels, where each dwelling unit may have an individual smart alert hub and similar or identical IoT devices. Advantageously, alerts from devices can be aggregated to order parts or services for multiple dwelling units from the same supplier. Additionally, in the event of a failure of one hub due to, for example, a local power or hardware outage, the hub information can be rerouted to another smart alert hub without disrupting service to the user and without interrupting electronic data interchange with source devices, subscribers, and suppliers. As such, system users are enabled to more efficiently manage their relationships, in relation to alerts, with each other as well as with third parties.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments may be implemented using an existing computer processor, or by a special purpose computer processor incorporated for this or another purpose or by a hardwired system.

As noted above, embodiments within the scope of this disclosure include program products including non-transitory machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is shown. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of distributing alerts based on received internet of things device information, the method comprising:
    receiving, by an alert routing system, information from an internet of things device associated with a subscriber of the alert routing system;
    determining, by the alert routing system, that the information corresponds to an alert condition;
    determining, by the alert routing system, a final alert recipient hierarchy including at least a first alert recipient, the final alert recipient hierarchy representing an alert distribution order, comprising:
        sending a request for location information to a first user device associated with the first alert recipient and a second user device associated with a second alert recipient;
        responsive to receiving requested location information of the first user device associated with the first alert recipient, and based at least on comparing the requested location information with a location of an alert, determining whether the first alert recipient is within a first threshold distance of the location of the alert,
        if the first alert recipient is within the first threshold distance, then setting the first alert recipient as a first-in-line recipient in the final alert recipient hierarchy;
        if the first alert recipient is not within the first threshold distance,
            determining whether a threshold distance override is associated with the first alert recipient,
            if the threshold distance override is associated with the first alert recipient, setting the first alert recipient as the first-in-line recipient in the final alert recipient hierarchy, and
            if no threshold distance override is associated with the first alert recipient, then responsive to receiving requested location information of the second user device associated with the second alert recipient, and based at least on comparing the requested location information with the location of the alert, determining whether the second alert recipient is within a second threshold distance of the location of the alert and, if the second alert recipient is within the second threshold distance, setting the second alert recipient as the first-in-line recipient in the final alert recipient hierarchy;
    generating, by the alert routing system, a first alert message including an identification of a type of alert, a time of the alert, and the location of the alert; and
    sending, by the alert routing system, the first alert message to a user device associated with the first-in-line recipient.

2. The method of claim 1, further comprising receiving, by the alert routing system, a response to the first alert message from the user device associated with the first-in-line recipient.

3. The method of claim 2, further comprising broadcasting, by the alert routing system, an all-clear message to all recipients of alert messages relating to the alert condition.

4. The method of claim 1, further comprising determining, by the alert routing system, an initial alert recipient hierarchy based at least in part on preferences of the subscriber, the initial alert recipient hierarchy including the first alert recipient, the second alert recipient, and a third alert recipient, wherein the first alert recipient is not the first-in-line recipient in the initial alert recipient hierarchy.

5. The method of claim 4, further comprising:
    receiving, by the alert routing system, first location information from the first user device associated with the first alert recipient, second location information from the second user device associated with the second alert recipient, and third location information from a third user device associated with the third alert recipient;
    determining, by the alert routing system, that the first user device is closest to the location of the alert condition; and generating, by the alert routing system, the final alert recipient hierarchy by reordering the initial alert recipient hierarchy such that the first alert recipient is the first-in-line recipient.

6. The method of claim 5, further comprising determining, by the alert routing system, that the second user device is beyond the second threshold distance from the location of the alert condition, wherein generating the final alert recipient hierarchy includes removing the second alert recipient from the initial alert recipient hierarchy.

7. The system of claim 4, wherein the determination of a best available alert recipient is based on a comparison of a first score associated with the first alert recipient, a second score associated with the second alert recipient, and a third score associated with the third alert recipient.

8. The system of claim 7, wherein at least one of the first score, the second score, and the third score is based on at least one of gender, age, ability to repair or fix a problem associated with the alert, and proximity to the alert.

9. The system of claim 4, wherein the determination of the first-in-line recipient is based on a first skill associated with the first alert recipient, a second skill associated with the second alert recipient, and a third skill associated with the third alert recipient, wherein the first skill, the second skill, and the third skill comprise a plurality of skills.

10. The system of claim 9, wherein the plurality of skills comprise an ability of the first alert recipient, the second alert recipient, and the third alert recipient to repair or fix a problem associated with the alert.

11. The method of claim 1, further comprising determining, by the alert routing system, that a response to the first alert message has not been received within a threshold period of time.

12. The method of claim 11, further comprising sending, by the alert routing system, a second alert message to the second user device associated with the second alert recipient, wherein the second alert recipient is a second-in-line recipient in the final alert recipient hierarchy.

13. The method of claim 11, further comprising:
determining, by the alert routing system, that the first alert recipient is the only alert recipient in the final alert recipient hierarchy; and
resending, by the alert routing system, the first alert message to the first user device.

14. The system of claim 1, wherein the information received comprises one or more of temperature information from a heating and cooling device, heart rate information, flow information associated with water or natural gas, and usage information associated with appliances.

15. The system of claim 14, wherein the information includes a priority indicator.

16. An alert routing system comprising:
a subscriber database storing a plurality of subscriber profiles;
a device database storing associations between a plurality of internet of things device associations with the plurality of subscriber profiles;
a network interface configured to receive information from a plurality of internet of things devices related to conditions monitored by the internet of things devices; and
at least one processor and memory, the memory having instructions stored therein that are executed by the at least one processor and cause the at least one processor to:
receive information from an internet of things device relating to a condition monitored by the internet of things device, the internet of things device associated with a subscriber of the alert routing system;
determine that the information corresponds to an alert condition;
determine a final alert recipient hierarchy including at least a first alert recipient, the final alert recipient hierarchy representing an alert distribution order, comprising causing the at least one processor to:
send a request for location information to a first user device associated with the first alert recipient and a second user device associated with a second alert recipient;
responsive to receiving requested location information of the first user device associated with the first alert recipient, and based at least on comparing the requested location information with a location of an alert, determine whether the first alert recipient is within a first threshold distance of the location of the alert;
if the first alert recipient is within the first threshold distance, then setting the first alert recipient as a first-in-line recipient in the final alert recipient hierarchy;
if the first alert recipient is not within the first threshold distance,
determine whether a threshold distance override is associated with the first alert recipient,
if the threshold distance override is associated with the first alert recipient, set the first alert recipient as the first-in-line recipient in the final alert recipient hierarchy, and
if no threshold distance override is associated with the first alert recipient, then responsive to receiving requested location information of the second user device associated with the second alert recipient, and based at least on comparing the requested location information with the location of the alert, determine whether the second alert recipient is within a second threshold distance of the location of the alert and, if the second alert recipient is within the second threshold distance, setting the second alert recipient as the first-in-line recipient in the final alert recipient hierarchy;
generate a first alert message including an identification of a type of alert, a time of the alert, and the location of the alert; and
send the first alert message to a user device associated with the first-in-line recipient.

17. The system of claim 16, wherein the memory further includes instructions that cause the at least one processor to receive a response to the first alert message from the user device of the first-in-line recipient.

18. The system of claim 17, wherein the memory further includes instructions that cause the at least one processor to broadcast an all-clear message to all recipients of alert messages relating to the alert condition.

19. The system of claim 16, wherein the memory further includes instructions that cause the at least one processor to determine an initial alert recipient hierarchy based at least in part on preferences of the subscriber, the initial alert recipient hierarchy including the first alert recipient, the second alert recipient, and a third alert recipient, wherein the first alert recipient is not the first-in-line recipient in the initial alert recipient hierarchy.

20. The system of claim 19, wherein the memory further includes instructions that cause the at least one processor to:

receive first location information from the first user device, second location information from the second user device associated with the second alert recipient, and third location information from a third user device associated with the third alert recipient;

determine that the first user device is closest to the location of the alert condition; and generate the final alert recipient hierarchy by reordering the initial alert recipient hierarchy such that the first alert recipient is the first-in-line recipient.

21. The system of claim 20, wherein the memory further includes instructions that cause the at least one processor to determine that the second user device is beyond the second threshold distance from the location of the alert condition, wherein generating the final alert recipient hierarchy includes removing the second alert recipient from the initial alert recipient hierarchy.

22. The system of claim 16, wherein the memory further includes instructions that cause the at least one processor to determine that a response to the first alert message has not been received within a threshold period of time.

23. The system of claim 22, wherein the memory further includes instructions that cause the at least one processor to send a second alert message to the second user device associated with the second alert recipient, wherein the second alert recipient is a second-in-line recipient in the final alert recipient hierarchy.

24. The system of claim 16, wherein the memory further includes instructions that cause the at least one processor to:

determine that the first alert recipient is the only alert recipient in the final alert recipient hierarchy; and resend the first alert message to the first user device.

* * * * *